United States Patent [19]

Haines

[11] 4,315,665
[45] Feb. 16, 1982

[54] COMPOSITE OPTICAL ELEMENT HAVING CONTROLLABLE LIGHT TRANSMISSION AND REFLECTION CHARACTERISTICS

[75] Inventor: Kenneth A. Haines, San Jose, Calif.

[73] Assignee: Eidetic Images, Inc., Santa Clara, Calif.

[21] Appl. No.: 73,511

[22] Filed: Sep. 7, 1979

[51] Int. Cl.³ .............................................. G03H 1/02
[52] U.S. Cl. .................. 350/3.61; 350/3.70; 351/44
[58] Field of Search ................ 350/3.60, 3.61, 3.70, 350/3.85, 3.86; 351/44, 45, 47, 50, 51

[56] References Cited

U.S. PATENT DOCUMENTS

| | | | |
|---|---|---|---|
| T861,026 | 4/1969 | Harper et al. | 350/3.6 X |
| T877,005 | 8/1970 | Schindler | 351/44 |
| 3,552,853 | 1/1971 | Sanders et al. | 350/3.61 X |
| 3,628,854 | 12/1971 | Jampolsky | 351/45 X |
| 3,633,988 | 1/1972 | Farrar | 350/3.7 X |
| 3,703,407 | 11/1972 | Hannan et al. | 350/3.61 |
| 3,945,825 | 3/1976 | Gale et al. | 350/3.61 X |
| 4,014,602 | 3/1977 | Ruell | 350/3.61 |

*Primary Examiner*—John D. Lee
*Attorney, Agent, or Firm*—Limbach, Limbach & Sutton

[57] ABSTRACT

A three layer composite optical structure wherein a first layer is a substrate having surface variations holographically formed therein that contain phase information of a light pattern or object desired to be reconstructed from the element by reflection, a thin substantially uniform layer of material coated over that surface variation, and a third layer that overcoats the thin layer in order to form a substantially uniform thickness composite structure. The indices of refraction of the overcoating and the substrate are made substantially the same so that light transmitted through the element is neither diffracted nor refracted. The thin intermediate layer is disclosed to be either reflective metal or a substantially transparent layer having an index of refraction substantially different from that of the other two layers. Such an element has applications in sunglasses or as an addition to car or other windows.

13 Claims, 6 Drawing Figures

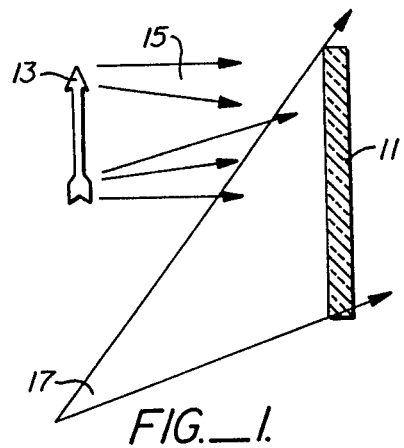
FIG._1.
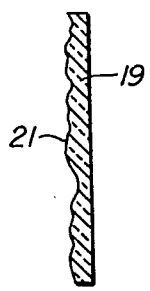
FIG._2.
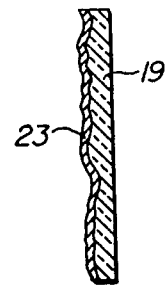
FIG._3.
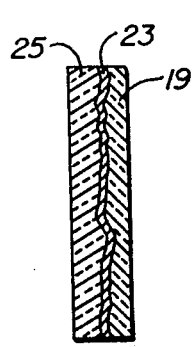
FIG._4.
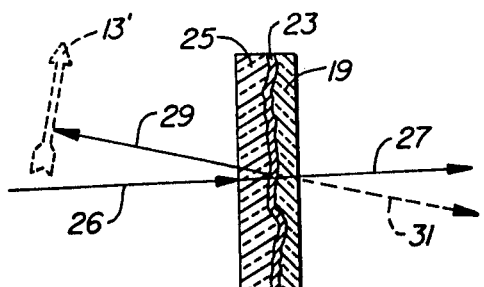
FIG._5.
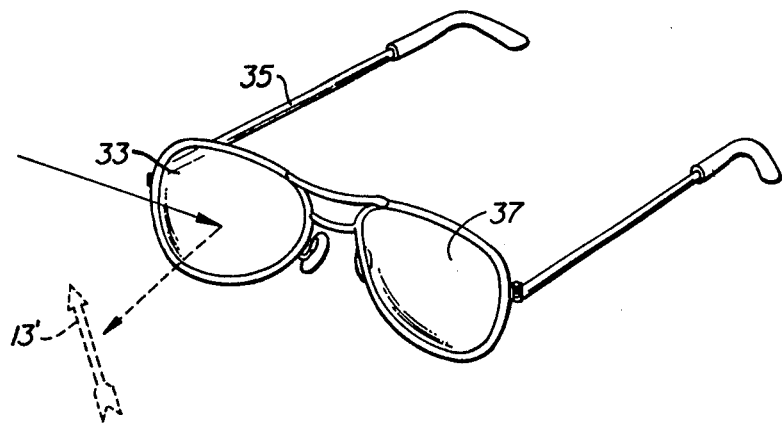
FIG._6.

COMPOSITE OPTICAL ELEMENT HAVING CONTROLLABLE LIGHT TRANSMISSION AND REFLECTION CHARACTERISTICS

BACKGROUND OF THE INVENTION

This invention relates generally to composite optical elements and more particularly to a composite element utilizing holography to form decorative light patterns without detracting from the primary function of the optical element.

Light attenuating films and elements, such as those used in sunglasses and on windows, often are made to reflect a substantial portion of light incident thereon. It is a principal object of the present invention to provide a composite optical element structure that attenuates light passing through it according to present requirements but that also reflects an optical image or light pattern that is desired for decorative purposes.

SUMMARY OF THE INVENTION

Briefly, this and additional objects of the present invention are accomplished by a three layer structure wherein a first layer is a substrate having information of the light pattern or optical image to be reflected formed holographically as a surface relief pattern on one substrate surface. A thin uniform thickness coating is then applied to the surface relief pattern in a manner to conform to it. The third layer is applied to the thin coating in a manner to form a composite structure of substantial uniform thickness. The thin layer of material may either itself be partially reflective, such as a layer of deposited metal, or may be a transparent material having an index of refraction substantially different than that of the other two layers. An optical image or light pattern is then formed in light reflected from the thin layer. The image or light pattern may come to focus within the element or elsewhere depending upon how the surface relief pattern is formed. The substrate and coating material are substantially transparent and made to have substantially the same index of refraction so that the unreflected light that passes through the structure is not diffracted or refracted by it. Such an optical element has possible applications in sunglasses or as a film that may be adhered to car or other windows.

Additional objects, advantages and features of the present invention become apparent from the following detailed description of a preferred embodiment thereof which should be taken in conjunction with the accompanying drawings.

BRIEF DESCRIPTION OF THE DRAWINGS

FIG. 1 illustrates a holographic technique for forming the substrate surface relief pattern;

FIG. 2 is a cross-sectional view of a substrate with a surface relief pattern formed according to the technique illustrated in FIG. 1;

FIG. 3 illustrates in cross-sectional view the substrate of FIG. 2 with a thin layer of material added to its surface relief pattern;

FIG. 4 illustrates in cross-section a three layer composite optical element according to the present invention;

FIG. 5 shows the optical characteristics of the resulting composite structure of FIG. 4; and FIG. 6 shows one application of the optical element formed in the manner illustrated in FIGS. 1 through 5.

DESCRIPTION OF A PREFERRED EMBODIMENT

Referring initially to FIG. 1, a holographic technique is described for forming a surface relief pattern that reflects object images. Other known techniques for forming a surface relief pattern may alternatively be employed, but a holographic method has many advantages including that of simplicity and flexibility. It is the only practical method to form images of objects in the reflected light beam from the composite optical element to be formed.

A holographic detecting film 11 is utilized in the method shown in FIG. 1 to record information of an object 13. The object 13, according to known techniques of holography, is illuminated with coherent light and object modified radiation 15 is captured by the holographic detector 11. A reference beam 17 of coherent radiation is also directed against the detector 11 at a finite angle with the object modified beam 15. it is also possible to bring in the reference beam from the side of the detecting film opposite to that shown in FIG. 1. This method is known as "back beam" holography. The radiation illuminating the object 13 and the reference beam 17 are coherent with each other, usually derived from the same coherent light source which is typically a laser. The object 13 may be diffusely reflective, in which case the object beam 15 is reflected therefrom, or may be a non-diffuse transparency, in which case the object illuminating beam is passed through the transparency onto the holographic detector 11.

The detector 11 receives a pattern of light interference fringes to be recorded on it. These fringes are formed by the interference of the reference beam 17 and the object modified beam 15. For the purposes of the present invention, it is desired that the intensity variations of this interference pattern be recorded as surface variations on one surface of a substrate 19 as illustrated in FIG. 2. It is desired that this substrate 19 be substantially optically transparent over its surface but that a surface relief pattern 21 contain information of the object 13 for later reconstruction. Standard techniques of surface relief holography may be employed, such techniques utilizing for the detector 11 photoresist material, ordinary silver halide photographic film that is either bleached or etched to form a surface relief pattern, or a thermoplastic material, as examples. The substrate 19 with the surface relief 21 is preferably one of mass produced substrates from a master hologram made from the detector 11. Multiple copies of the surface relief hologram 19 may be copied according to known optical techniques from a master hologram 11, or multiple copies of the hologram 19 may be made by an embossing process from a metal master that is constructed directly from the master hologram 11.

For the specific example illustrated with respect to the drawings, the holograms are made of an object 13. But for certain applications, it may be unnecessary or undesirable to record a specific object image. It may be enough to interfere with the reference beam 17 of FIG. 1, a plane wave or some other beam with its curvature optically controlled in place of the object modified beam 15. The results will be a hologram that reconstructs, when properly illuminated, a light pattern depending upon the curvature of the two interferring beams.

Each surface relief hologram substrate 19 is coated with a thin layer 23 of material having a uniform thickness. The layer 23 is "thin" in relation to the thickness of the substrate 19 and is made to conform closely to the surface variations 21 of the substrate 19. The next manufacturing step for each article is to apply a coating 25 over the thin layer 23 in order to form a composite structure of substantially uniform thickness. The coating 25 is partially optically transparent. The indices of refraction for each of the substrate 19 and the coating layer 25 are made to be substantially equal in order to eliminate the effect on light transmitted through the structure of the surface relief 21.

The surface relief 21 is desired to affect light reflected from the structure. The thin intermediate layer 23 is provided for that purpose. In one form, the layer 23 is a metal that is applied to the substrate 19 by vapor deposition or other known processes. Existing sunglasses use such a metalizing process in order to reflect a portion of incident light thereon and to allow another portion of incident light to pass through to the wearer's eyes. Of course, existing sunglasses reflect light as would a mirror and do not form any light pattern or object image as is possible with the structure according to the present invention. Aluminum is one material that may form the layer 23. The thickness of the layer 23 controls the amount of light that is allowed to pass through the composite structure. It is desired that at least 5% of incident light be reflected by the layer 23 while the remainder of the intensity of incident light be allowed to pass through the structure.

Alternatively, the layer 23 may be of a substantially transparent material having an index of refraction that is substantially different from the indices of refraction of the substrate 19 and the coating layer 25. The result is an optical interface which reflects light. The index of refraction of the layer 23 should differ from that of the layers 19 and 25 by more than 3%.

FIG. 5 schematically illustrates the operation of the composite structure of FIG. 4. Incident light 26, such as sunlight, strikes one side of the structure. A portion of this light is allowed to pass through the structure in a beam 27 while the remaining intensity of the incident light 26 is reflected as a beam 29. An optical image 13' is formed in the reflected light beam 29 in space a distance removed from the composite structure, according to the manner in which the initial hologram is made as shown in FIG. 1. It is desired that light which would otherwise be diffracted upon transmission through the structure, such as a diffracted beam 31, be made as close to zero intensity as possible. It is substantially zero when the indices of refraction of the layers 19 and 25 are matched since the surface relief then has no effect on transmitted light.

The recorded surface relief 21, as followed by the reflective coating 23, alters the phase of the reflected light beam 29 in order to form the image 13' therein, according to known holographic principles. But the structure is made so that there is no variation in that phase caused by the surface relief pattern 21 to the component of light 27 that is transmitted through the structure. Thus, the element made according to FIGS. 1 through 5 has application for shading windows or for sunglasses since the transmitted light will be unaffected by the techniques used to obtain a light pattern or image in the reflected light beam. In FIG. 6, an element 33 as shown in FIG. 5 is held in ordinary eye glass frames 35. Similarly, another element 37 constructed in the same manner is also held by the glass frames 35. The image or light pattern reconstructed upon reflection from the element 37 may be made to be the same as that of the element 33 or may be something different.

Although the various aspects of the present invention have been described with respect to a preferred embodiment thereof, it should be understood that the invention is entitled to protection within the full scope of the appended claims.

It is claimed:

1. A method of making an optical element having differing transmissive and reflective characteristics, comprising the steps of:

forming on a substantially optically transparent substrate a surface relief hologram containing phase information in its surface variations of an interference pattern resulting from intersecting two coherent radiation beams at a finite angle with each other, forming a partially reflective surface over the surface variations of said substrate by applying thereto a thin substantially uniform thickness layer of material having optical characteristics different than those of said substrate in order to form as part of a composite structure a partially reflecting surface that follows the hologram surface variations, and coating the thin layer of material in a manner to fill in the surface variations of the partially reflective surface with a substantially optically transparent layer of material having substantially the same refractive index as does said substrate and which makes the surface smooth, whereby a portion of light incident upon said composite structure travels through it with substantially no phase variation while another portion of incident light is reflected from it which contains phase information intially recorded in the surface relief hologram.

2. The method according to claim 1 wherein the step of applying a thin layer of material to the substrate surface relief includes the step of applying a thin layer of material that itself reflects over 5% of light incident thereon but which allows some significant portion of light to pass through the thin layer.

3. The method according to claim 2 wherein the thin layer of material consists primarily of aluminum.

4. The method according to claim 1 wherein the step of forming a partially reflective surface comprises the step of coating the surface variations of the substrate with a transparent material having a refractive index that differs from the refractive index of the substrate by at least 3%, whereby a partially reflective surface is formed at the interfaces of said thin material and said substrate and coating.

5. The method according to claim 1 wherein the step of forming a surface relief hologram comprises the steps of reflecting light from a three-dimensional diffusely reflective object onto a hologram detector as one of said two coherent radiation beams, the other of said beams being a reference beam, whereby an image of said object is reconstructed in light reflected from the composite optical element.

6. The method according to claim 1 wherein the step of forming a surface relief hologram comprises the step of directing coherent radiation through a non-diffuse object transparency and thence onto a hologram detector as one of said coherent radiation beams, the other beam forming a reference beam, whereby an image of said transparency is reconstructed in light reflected from the composite optical element.

7. The method according to any of claims 1 through 6, inclusive, which comprises the additional step of mounting said optical element in any eye glass frame.

8. A composite optical structure having different transmissive and reflective characteristics, comprising:
a substrate layer having surface variations on one side thereof and a substantially smooth surface on the other side thereof, said surface variations containing information of a light diffraction pattern,
an overcoat layer of material on said surface variation side of the substrate that smooths out said variations and having a thickness such that the composite structure is substantially uniform in thickness, the refractive indices of the substrate and coating materials being substantially the same, whereby light transmitted through said composite structure is substantially undiffracted and unrefracted by the surface variations of the substrate, and
a thin layer of material of substantially uniform thickness and held between the substrate and coating in a manner to conform to the surface variations of the substrate, said thin layer of material characterized by partially reflecting light incident on the composite structure, thereby to reflect a light pattern that is formed by the surface relief pattern of the substrate.

9. The composite optical structure according to claim 8 wherein said thin layer of material is further characterized by itself reflecting over 5% of light incident on it while allowing a substantial portion of incident light to pass therethrough.

10. The composite optical structure of claim 8 wherein said thin layer of material is further characterized by being substantially transparent but having an index of refraction that differs from the index of refraction of said substrate by more than 3%, wherein a partially reflecting surface is formed.

11. A composite optical element according to claim 8 wherein the surface variations in the substrate contain information of an object, wherein an image of that object is formed in light reflected by the structure.

12. A composite optical element according to claim 8 wherein the surface variations of the substrate contain information of a light pattern, wherein said light pattern is formed in light reflected from the optical element.

13. In sunglasses that include a frame and a pair of optical elements held by the frame, the improvement wherein each of said optical elements comprises:
a substrate layer having surface variations on on side thereof and a substantially smooth surface on the other side thereof, said surface variations containing information of a light diffraction pattern,
an overcoat layer of material on said surface variation side of the substrate that smooths out said variations and having a thickness such that the composite structure is substantially uniform in thickness, the refractive indices of the substrate and coating materials being substantially the same, whereby light transmitted through said composite structure is substantially undiffracted and unrefracted by the surface variations of the substrate, and
a thin layer of material of substantially uniform thickness and held between the substrate and coating in a manner to conform to the surface variations of the substrate, said thin layer of material characterized by partially reflecting light incident on the composite structure, thereby to reflect a light pattern that is formed by the surface relief pattern of the substrate.

* * * * *